(12) United States Patent
Peng et al.

(10) Patent No.: US 7,824,078 B2
(45) Date of Patent: Nov. 2, 2010

(54) COVER THAT HAS A LOGO AND THAT THE LOGO HAS THREE-DIMENSIONAL APPEARANCE

(75) Inventors: Hsueh-Chih Peng, Taipei Hsien (TW); Yan-Lin Kuo, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 326 days.

(21) Appl. No.: 12/164,173

(22) Filed: Jun. 30, 2008

(65) Prior Publication Data
US 2009/0116248 A1   May 7, 2009

(30) Foreign Application Priority Data
Nov. 7, 2007   (TW) ............................... 96142129 A

(51) Int. Cl.
*F21V 11/00* (2006.01)

(52) U.S. Cl. .................. 362/351; 362/253; 362/311.01; 362/602; 362/607; 40/541

(58) Field of Classification Search ................ 362/154, 362/253, 311.01, 311.03, 311.13–311.14, 362/351, 362, 600, 602, 605–607, 632; 40/541, 40/546; 349/58; 361/679.01–679.02
See application file for complete search history.

(56) References Cited

U.S. PATENT DOCUMENTS 6,494,593 B2   12/2002   An et al.
6,874,903 B2 *   4/2005   Yang et al. .................. 362/604

* cited by examiner

*Primary Examiner*—Sandra L O'Shea
*Assistant Examiner*—Meghan K Dunwiddie
(74) *Attorney, Agent, or Firm*—Alan Kamrath; Kamrath & Associates PA

(57) ABSTRACT

A cover of an electronic device has a body inside and is penetrable by light yield from an illumination device. The body has an inner surface having a region impenetrable by light as a light-blocking region and the remaining region penetrable by light as a light-passing region. The body further has an outer surface having a region impenetrable by light as another light-blocking region and the remaining region penetrable by light as another light-passing region. The light-blocking region of the outer surface correspond to the light-passing region of the inner surface in shape, but in a size that is smaller, so that when light pass through the body, light can give an effect that the shape of the light-blocking region looks three-dimensional.

16 Claims, 5 Drawing Sheets

COVER THAT HAS A LOGO AND THAT THE LOGO HAS THREE-DIMENSIONAL APPEARANCE

BACKGROUND OF THE INVENTION

1. Field of the Invention

The present invention relates to a cover used by an electronic device, in particular, to a cover that has a logo and the logo has three-dimensional appearance.

2. Description of the Related Art

Generally, an electronic device such as a notebook computer has a cover in which a product logo is provided to thereby emphasize the brand and for the purpose of increasing rate of market exposure.

Conventionally, a 2-D logo is used, as it can be easily made and easily fixed to the cover. However, the practice of using the 2-D logo has become too customary for the public and therefore has little effect to engrave itself into our memory.

While the prior art teaches a 3-D logo, the 3-D logo is made by involving recesses-cutting process, which is regarded as not favoring. Also, the logo itself is easily damaged by abrasion.

U.S. Pat. No. 6,494,593 teaches an alternative method to promote its product logo 800, in which the logo 800 is shined by a light emitting part 21. Notwithstanding the logo 800 becomes more promotive in comparison to a 2-D logo, the logo 800 still can not have a 3-D appearance. Furthermore, it is noted that the invention includes a plurality of holes 700 that allows for light emitted from the light emitting part 21 to shine the logo 800, these holes 700 are not favoring, because these holes 700 incur an extra process and cost. Additionally, the holes 700 can induce dust to get into the case 200, thus resulting electrostatic problem to electronics.

The present invention is, therefore, intended to obviate or at least alleviate the problems encountered in the prior art.

SUMMARY OF THE INVENTION

According to the present invention there is provided, a cover of an electronic device has a body installed inside and is penetrable by light yielded from an illumination device. Preferably, the illumination device is mounted in the cover.

In one embodiment, the body has an inner surface incorporating a material impenetrable by light as a light-blocking region and the remaining of the inner surface defined as a light-passing region. The body further has an outer surface incorporating a material impenetrable by light as a light-blocking region and the remaining of the outer surface as a light passing region. The light-blocking region of the outer surface corresponds to the light-passing region of the inner surface in shape, but in a size that is smaller, so that when light passes through the body, light can pass through a gap defined between the contour of the light-blocking region on the outer surface and the light-passing region on the inner surface, and whereby gives an effect that the shape of the light-blocking region on the outer surface of the body looks three-dimensional.

In another embodiment, the light blocking regions of the body are coarse surfaces fabricated from the body so that the regions become translucent.

It is a primary object of the present invention that the light-blocking region on the outer surface of the body and the light-passing region on the inner surface of the body are representative of a product logo.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The present invention will be described with reference to the accompanying drawings which assist in illustrating the pertinent features thereof, in which.

DETAILED DESCRIPTION OF THE PREFERRED EMBODIMENT

Figure 1:
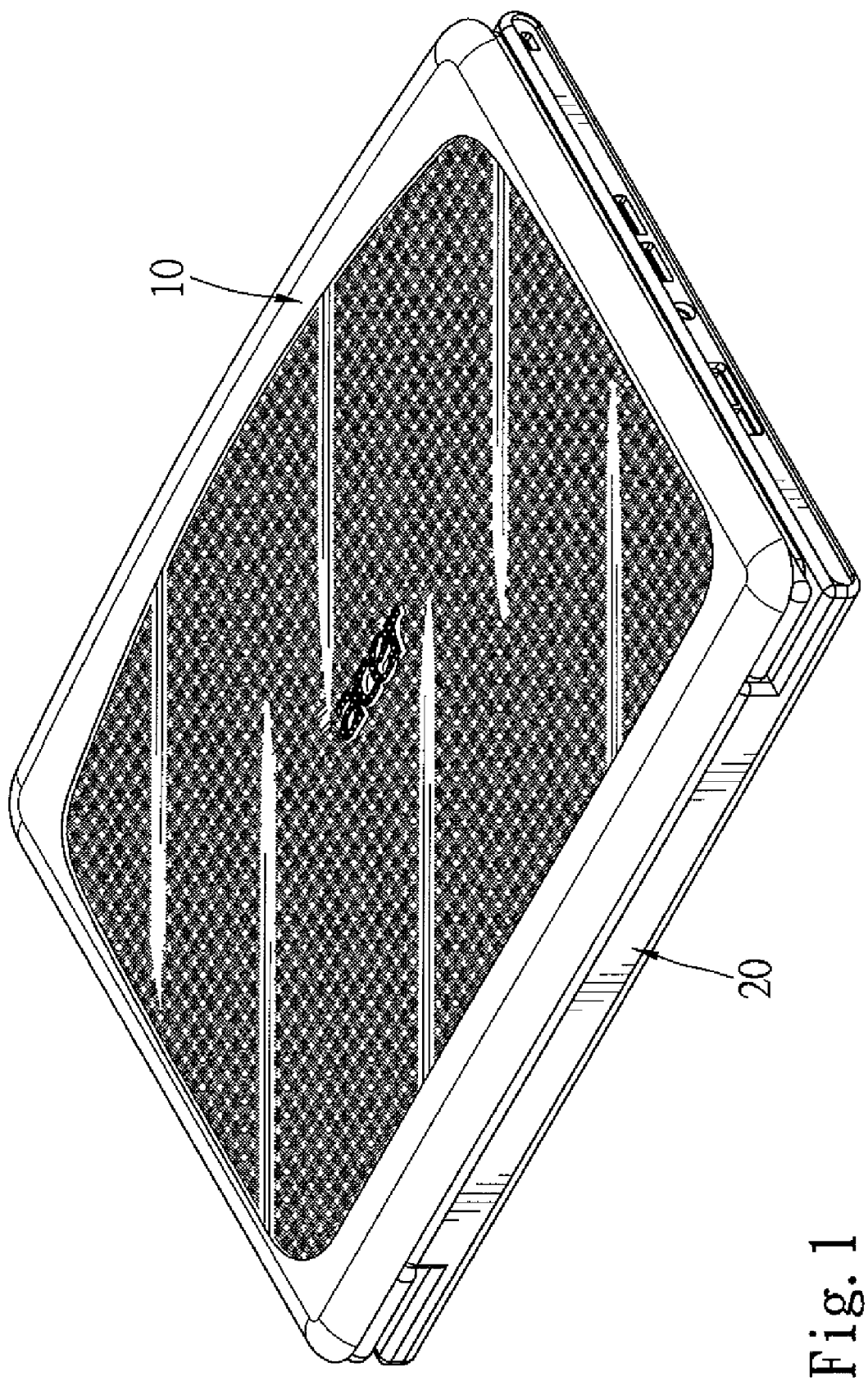
FIG. 1 is a perspective view of an electronic device utilizing a cover in accordance with the present invention.

Referring to FIG. 1, an electronic device includes a cover 10 pivotally hinged with a base 20.

Figure 2:
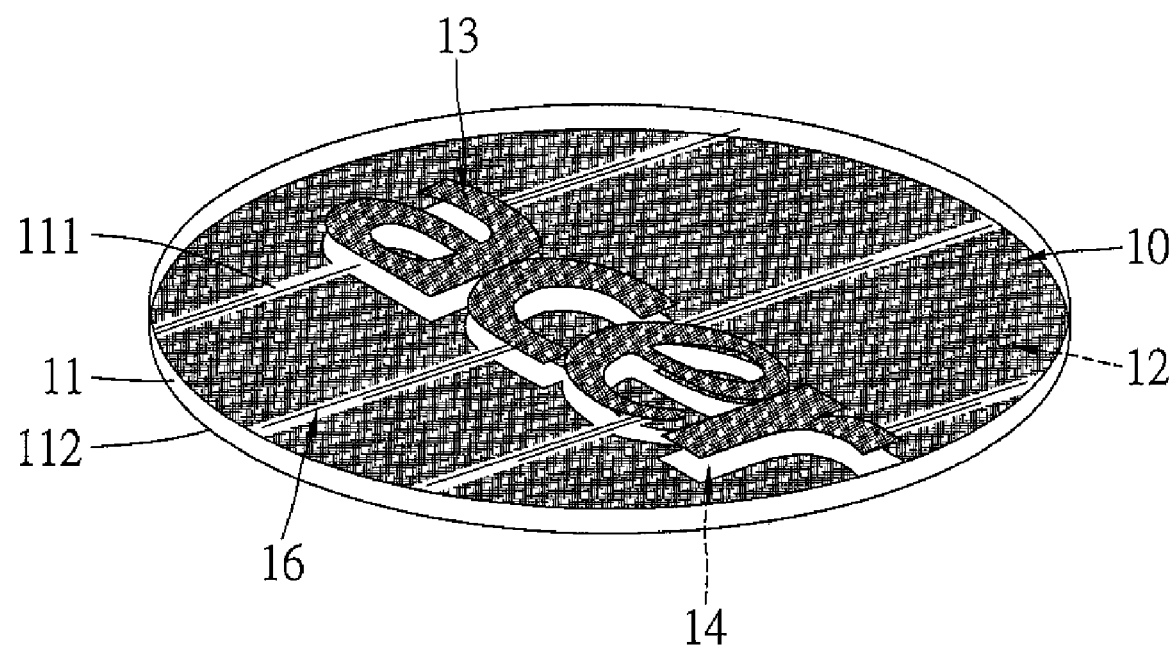
FIG. 2 is a partial, enlarged, perspective view of the cover of FIG. 1.
Figure 3:
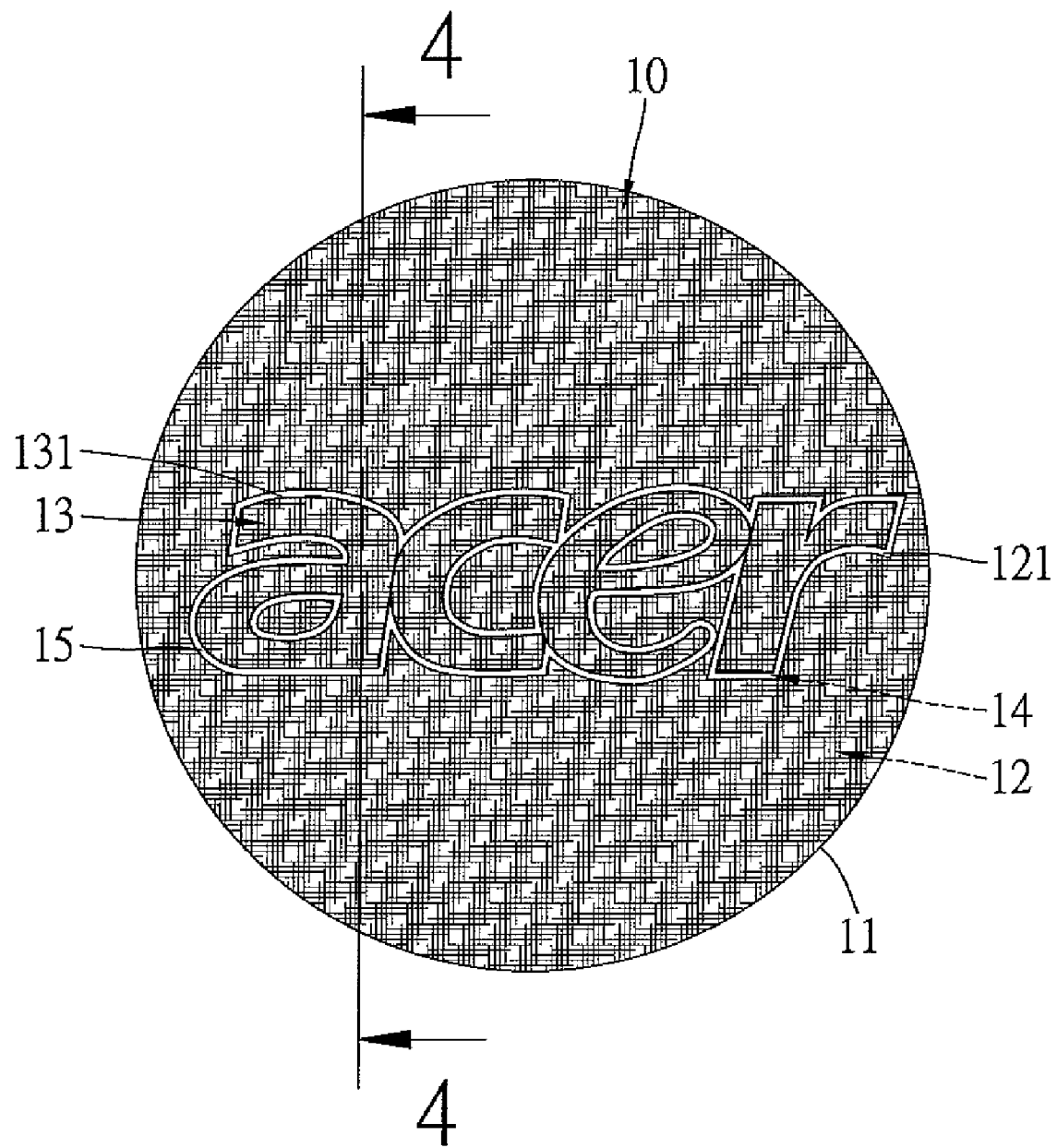
FIG. 3 is a top view of the cover of FIG. 2.
Figure 4:
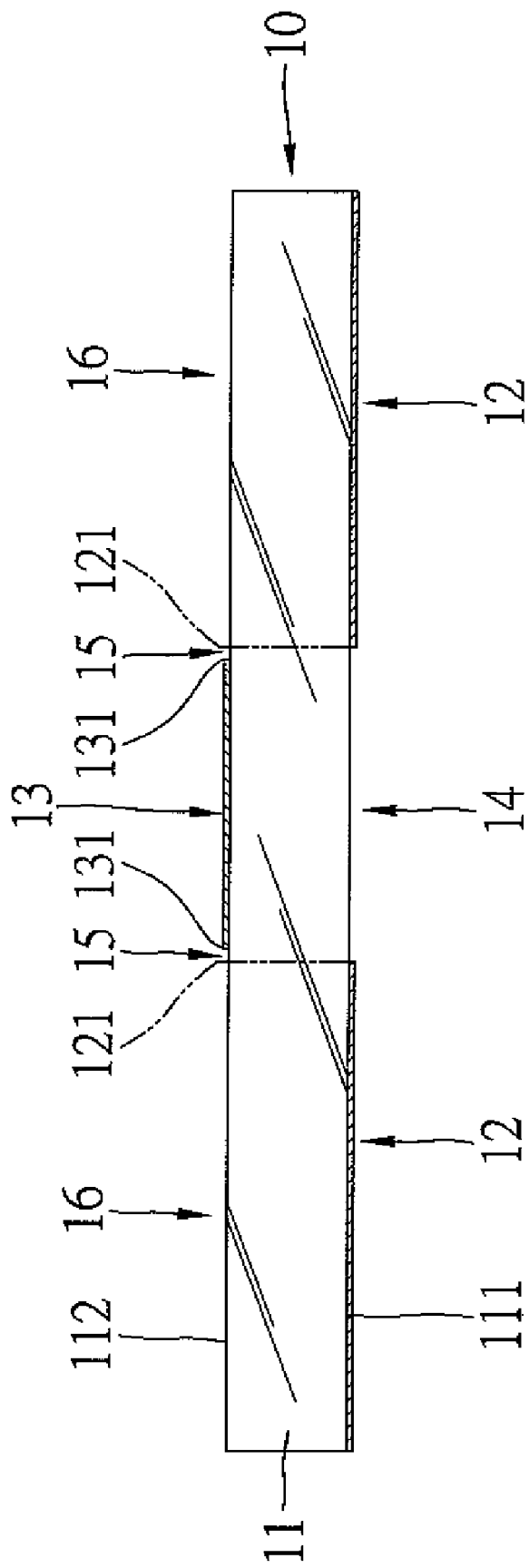
FIG. 4 is a cross-sectional view taken along line 4-4 of FIG. 3.

Referring to FIGS. 2 through 4, the cover 10 includes a body 11 that is made of transparent material in order to be penetrable by light yielded from an illumination device installed in the cover 10. Preferably, the illumination device is an LCD screen. However, an LED light or other light source could also be installed in the cover 10 to serve as an illumination device.

The body 11 has a first surface as an inner surface 111 and a second surface as an outer surface 11 2, and the inner surface 111 being parallel to the outer surface 112. As best shown in FIG. 4, the inner surface 111 has a first light-blocking region 12 that serves to preclude light yield from the illumination device and a first light-passing region 14 defined by the remaining of the inner surface 111 that admits of light from the illumination device into the body 11 through the inner surface 111. Preferably, the first light-blocking region 12 is provided with a material that makes the regions impenetrable by light. Preferably, the material utilized is paint. Preferably, the first light-passing region 14 is coated with transparent paint. FIG. 4 also shows the outer surface 112 as having a second light-blocking region 13 and a second light-passing region 14 defined by the remaining of the outer surface 112 Preferably, the second light-blocking region 13 is provided with a material that makes the regions impenetrable by light. Preferably, the material utilized is paint. Preferably, the second light-passing region 16 is coated with transparent paint.

Still referring to FIG. 4, the second light-blocking region 13 is disposed oppositely corresponding to the first light-passing region 14 and the second light-passing region 16 is disposed oppositely corresponding to the first light-blocking region 12. Also, the second light-blocking region 13 is configured in a shape conforming that of the first light-passing region 14, but the shape being formed smaller than that of the first light-passing region 14. Consequently, light could further pass the body 11 through a gap 15 defined between the contour 131 of the second light-blocking region 13 and the contour 121 of the first light-passing region 12, and light passing through the gap 15 gives an effect that the shape of the second light-blocking region 13 looks three-dimensional.

Preferably, the first light passing region 14 and the second light light-blocking region 13 are representatives of a product logo.

Figure 5:
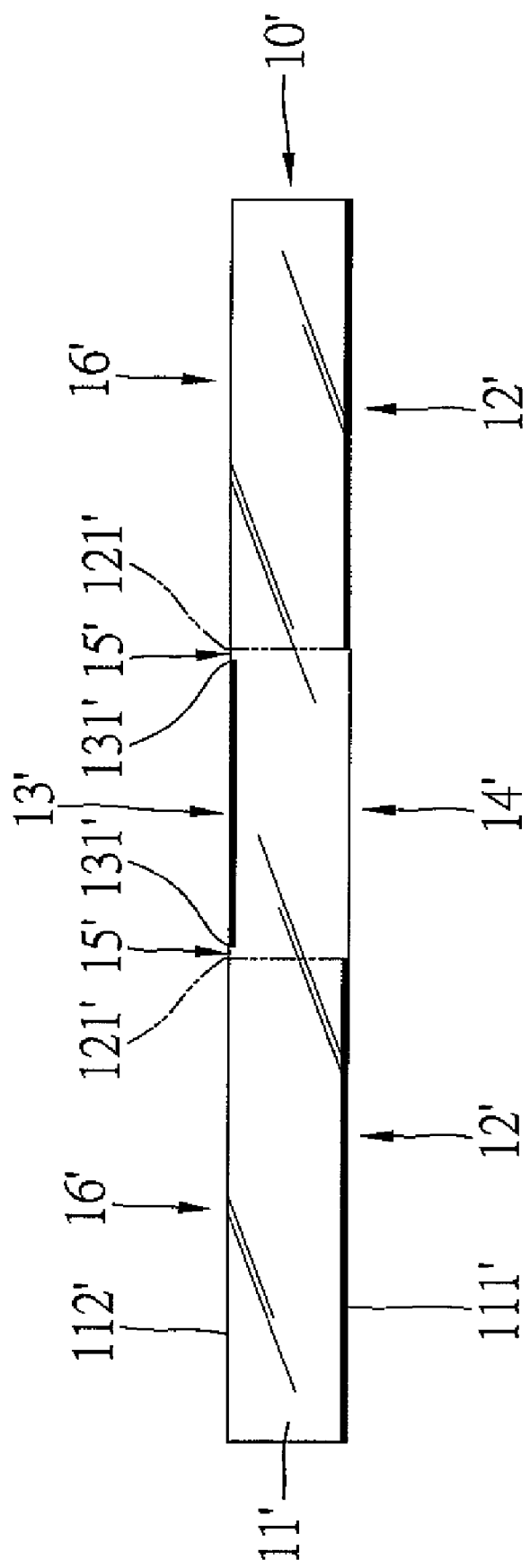
FIG. 5 is an alternative embodiment of the cover of the present invention.

Referring to FIG. 5, an alternative embodiment of the body 11 is shown, and wherein like numerals are employed to denote like components of the prior embodiment, however, bearing the "prime". In this embodiment, the first and second light-blocking regions 12' and 13' still serve to block light. However, the first and second light-blocking region 12' and 13' are a coarse surface fabricated from the body, in addition, the coarse surfaces are translucent. Thus, the light-blocking regions 12' and 13' are not absolutely impenetrable by light. Even though, the effect that makes the shape of the second light-blocking region 13' look three-dimensional could still be accomplished.

While the specific embodiments have been illustrated and described numerous modifications come to mind without significantly departing from the spirit of invention and the scope of invention is only limited by the scope of accompanying claims.

What is claimed is:

1. A cover of an electronic device having an illumination device installed inside comprising:
    a body made of transparent material and installed in the cover and exposed to the illumination device, the body having a first surface as an inner surface and a second surface as an outer surface; and
    the body comprising:
        a first light-blocking region and a first light-passing region defined on the inner surface, with the first light-passing region encompassed by the light-blocking region, wherein the first light-passing region admits of light from the illumination device into the body through the inner surface;
        a second light-blocking region and a second light-passing region defined on the outer surface, with the second light-blocking region oppositely corresponding to the first light-passing region and the second light-passing region oppositely corresponding to the first light-blocking region, the second light-blocking region configured in a shape conforming that of the first light-passing region, but the shape being formed smaller than that of the first light-passing region, and which thereby permits light to further pass the body through a gap defined between the contours of the second light-blocking region and the first light-passing region, whereby light passing through the gap gives an effect that the shape of the second light-blocking region looks three-dimensional.

2. The cover as claimed in claim 1 wherein the first and second light-blocking regions are provided with a material that makes the regions impenetrable by light.

3. The cover as claimed in claim 2 wherein the material utilized is paint.

4. The cover as claimed in claim 1 wherein the first and second light-blocking regions are coarse surfaces fabricated from the body, and the coarse surfaces are translucent.

5. The cover as claimed in claim 1 wherein the first and second light-passing regions are coated with transparent paint.

6. The cover as claimed in claim 1 wherein the first light-blocking region is provided with a material that makes the regions impenetrable by light.

7. The cover as claimed in claim 6 wherein the material utilized is paint.

8. The cover as claimed in claim 1 wherein the first light-blocking region is a coarse surface fabricated from the body, and the coarse surface is translucent.

9. The cover as claimed in claim 6 wherein second light-blocking region is provided with a material that makes the regions impenetrable by light.

10. The cover as claimed in claim 9 wherein the material utilized is paint.

11. The cover as claimed in claim 6 wherein the second light-blocking region is a coarse surface fabricated from the body, and the coarse surface is translucent.

12. The cover as claimed in claim 8 wherein the second light-blocking region is provided with a material that makes the regions impenetrable by light.

13. The cover as claimed in claim 12 wherein the material utilized is paint.

14. The cover as claimed in claim 8 wherein the second light-blocking region is a coarse surface fabricated from the body, and the coarse surface is translucent.

15. The cover as claimed in claim 11 wherein the first and second light-passing regions are coated with transparent paint.

16. The cover as claimed in claim 14 wherein the first and second light-passing regions are coated with transparent paint.

* * * * *